Figure 1:
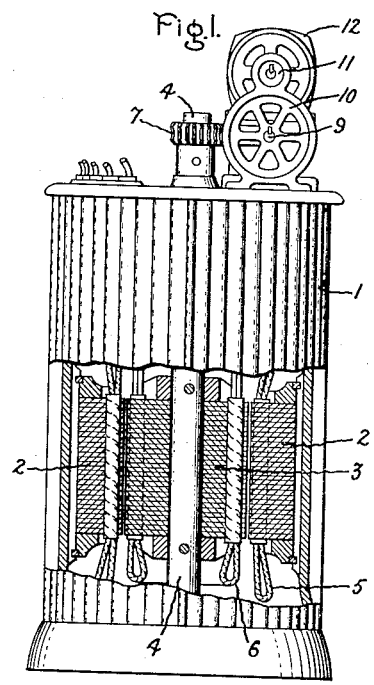

Inventor:
Harry R. West,
by Harry E. Dunham
His Attorney.

Patented Feb. 15, 1944

2,341,968

UNITED STATES PATENT OFFICE 2,341,968

INDUCTION VOLTAGE REGULATOR

Harry R. West, Pittsfield, Mass., assignor to General Electric Company, a corporation of New York Application February 18, 1943, Serial No. 476,311

8 Claims. (Cl. 171—119)

This invention relates to induction voltage regulators and more particularly to improvements in spring cushioned worm gear drives for such regulators.

An inducton voltage regulator consists essentially of a stator and a rotor, both of which carry windings. The rotor does not turn continuously as in an induction motor but is adjusted relative to the stator so as to adjust the coupling between the windings and thus adjust the voltage induced by one winding in the other winding. Both windings carry alternating current and it is well known that a vibratory torque of twice the frequency of the alternating current is developed in the rotor under all operating conditions of the rotor. This vibratory torque under certain operating conditions is the only torque developed by the rotor, while under other operating conditions it is superposed on a unidirectional torque of variable magnitude and direction depending upon the angular relation between the rotor and the stator and upon both the magnitude and power factor of the load current.

This vibratory torque which is sometimes accompanied by a unidirectional torque and which under other conditions is present alone has in the past been difficult to isolate with the result that it is transmitted to the stator elements of the regulator and causes objectionable noise both by reason of the vibration of the stator elements of the regulator and also by reason of gear chatter.

In my Patent 1,685,656, granted September 25, 1928, and assigned to the assignee of the present application, there is described a spring cushioned worm gear drive which has given excellent results for a number of years on large twenty-five cycle per second regulators but it has not been particularly useful on standard size sixty cycle per second regulators.

In accordance with the present invention there is provided a new and improved spring cushioned worm gear drive which gives excellent results on standard sixty cycle regulators. It is characterized by making the part of the stator structure which directly drives the rotor, and which consequently will under certain conditions partake of the vibration of the rotor, as light as possible and with a lost motion coupling between it and its driving means so that it can vibrate without transmitting its vibration to the rest of the stator structure. Furthermore, sufficient lost motion or clearance is provided between the teeth of the driving gears so that when no unidirectional component of torque is present the rotor gear can vibrate within this clearance without making contact with the stator gear which normally drives the rotor gear.

Other novel features of the invention will be apparent to those skilled in the art as the description proceeds.

An object of the invention is to provide a new and improved induction voltage regulator.

Another object of the invention is to provide a new and improved sound reducing drive for induction voltage regulators.

A further object of the invention is to provide an improved spring cushioned worm gear drive.

The invention will be better understood from the following description taken in connection with the accompanying drawing and its scope will be pointed out in the appended claims.

Figure 2:
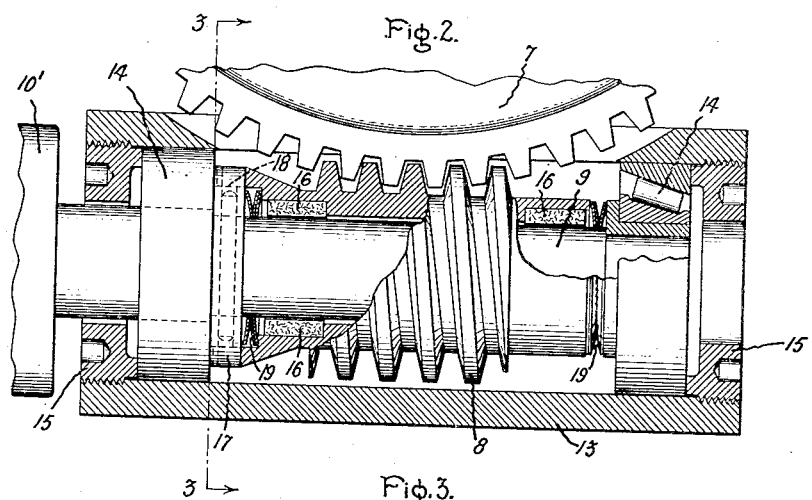
Figure 3:
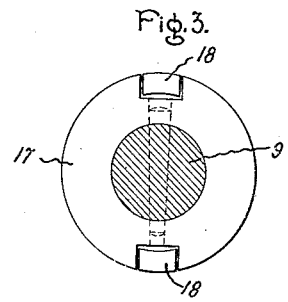

In the drawing Fig. 1 is a side view of an induction voltage regulator with its casing partly broken away, Fig. 2 is a detailed view partly in section of a preferred form of rotor adjusting means constructed in accordance with the present invention, and Fig. 3 is a sectional view taken on the line 3—3 of Fig. 2.

Referring now to the drawing and more particularly to Fig. 1 there is shown therein an induction voltage regulator comprising a casing 1 in which is mounted a stationary magnetic core member or stator 2 and a rotatable magnetic core member or rotor 3, the latter being rigidly fastened to a vertical shaft 4. Mounted in slots in these core members are stator and rotor windings 5 and 6 respectively.

For adjusting the angular relation between the rotor and stator a gear segment 7 is rigidly fastened to the shaft 4 at the top of the regulator. The teeth of this segment are engaged by a worm gear 8, shown more clearly in Fig. 2, which is mounted on a shaft 9 to one end of which is keyed a gear 10 which is in turn engaged by a gear 11 on the end of the shaft of a driving motor 12. This whole combination of gearing acts as a speed reducer whereby a low-torque high-speed motor can drive the rotor of the regulator slowly and against its relatively large torque.

Referring now to Fig. 2 the shaft 9 is mounted in a housing 13 by means of tapered roller bearings 14 which are held in place by collars 15 threaded into the ends of the housing 13. These roller bearings prevent any axial and radial movement of the shaft 9 which extends to the left through an opening in the collar 15 for attachment to the driving gear 10, only hub 10' of which is shown.

The worm 8 is fitted very loosely on the shaft 9 so that it may easily slide axially thereon. In order to prevent undesirable radial motion of the worm on the shaft while permitting free axial motion I have found that the use of linings 16 between the shaft and the inside of the worm gear is desirable. Very good results have been obtained when these linings or sleeves are composed of fabric impregnated with synthetic resin, such, for example, as the material marketed by the assignee herein as "Textolite." In smaller size regulators I have found that one such lining running the entire length of the worm is less expensive than two at each end.

For transmitting the motor torque to the worm 8 a coupling is provided between the shaft 9 and the worm 8. This coupling comprises a flange 17 shrunk on and pinned to the shaft 9. This flange has a pair of notches into which fit loosely a pair of diametrically opposite coupling lugs 18 which are integral with one end of the worm 8. The fit between the lugs and their cooperating slots in the coupling is sufficiently loose so that a substantial amount of clearance is obtained. Such clearance may also be obtained by means of a pin through the worm and shaft with a clearance hole in one of them.

For preventing the transmission of rotor vibration and the production of regulator noise during the operating condition in which no unidirectional component of rotor torque is present a substantial amount of clearance is provided between the teeth of the gear segment 7 and the worm 8, this clearance being greater than the amplitude of angular vibration of the gear segment 7. Consequently, the gear segment 7 can vibrate without coming in contact with the teeth of the worm 8. If the teeth of the segment 7 should strike the worm the latter would slide axially on the shaft 9 a sufficient amount to provide the necessary clearance so that further vibration would be entirely free on the part of the gear segment 7.

For minimizing stator vibration and noise under the operating condition in which unidirectional rotor torque is present spring cushions 19 are interposed between the ends of the worm and the roller bearings. These spring cushions have a substantial amount of clearance between the worm and the bearings so that the worm has a range of unrestrained or uncushioned axial motion. This is to permit it to take up a new stationary position in case it comes in contact with the teeth of the gear segment 7 under the operating condition in which no unidirectional torque component is present.

The spring cushions need not be of any particular type but good desults have been obtained with so-called Belleville springs, these comprising dished annular members of spring material. As shown, three are mounted at each end of the worm.

These spring cushions preferably have a nonlinear characteristic, that is to say, they are relatively soft and yielding for small deflections but their resistance rapidly builds up so that the more the deflection the greater the resistance to deflection. They are so constructed that under conditions of maximum unidirectional torque they will not be fully compressed.

Under some conditions of load there will be a very slight unidirectional component of torque causing the gear to push the worm up against the springs at one end with a very slight pressure. If the spring assembly is too stiff, an appreciable amount of gear noise may occur. It has been found that for best results with this particular condition of load a relatively soft spring is desirable. The most desirable stiffness of spring depends upon viscosity of the oil in which the gear is immersed and the friction between the worm and shaft. With a spring of sufficiently low initial rate the gear noise which will be obtained for this particular condition of load is found to be entirely negligible.

For low power factor loads the unidirectional torque is great. It is desirable, therefore, that as the spring assembly is compressed its stiffness will increase enough so that the springs will not be completely compressed at full load of the regulator. The result is that the natural frequency of vibration between rotor and stator will be lower than in the case of a solidly mounted worm and therefore the amplitude of vibration will be substantially decreased, for regulators of usual construction.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. An induction voltage regulator including a rotor and a stator, a worm and gear for adjusting the position of the rotor with respect to the stator, the gear being attached to the rotor so that it vibrates angularly therewith, and a drive shaft on which said worm is axially loosely slidable, the teeth of said worm and gear having a clearance greater than the amplitude of said angular vibration.

2. An induction voltage regulator including a rotor and a stator, a worm and gear for adjusting the position of the rotor with respect to the stator, the gear being attached to the rotor so that it vibrates angularly therewith, a drive shaft on which said worm is axially loosely slidable, the teeth of said worm and gear having a clearance greater than the amplitude of said angular vibration, and a coupling between said worm and said drive shaft which permits a substantial amount of axial motion of said worm and a slight amount of angular motion thereof relative to said shaft.

3. An induction voltage regulator including a rotor and a stator, a worm and gear for adjusting the position of the rotor with respect to the stator, the gear being attached to the rotor so that it vibrates angularly therewith, a drive shaft on which said worm is axially loosely slidable, the teeth of said worm and gear having a clearance greater than the amplitude of said angular vibration, and spring cushions for limiting the axial sliding motion of said worm on said drive shaft, there being a substantial amount of clearance between said worm and spring cushion whereby said worm has a substantial range of axial motion free from any spring cushioning.

4. An induction voltage regulator including a rotor and a stator, a worm and gear for adjusting the position of the rotor with respect to the stator, the gear being attached to the rotor so that it vibrates angularly therewith, a drive shaft on which said worm is axially loosely slidable, the teeth of said worm and gear having a clearance greater than the amplitude of said angular vibration, and non-linear spring cushions which are not fully compressed by the maximum unidirectional component of regulator torque for limiting the axial sliding motion of said worm on said drive shaft, there being a substantial amount of clearance between said worm and said spring cushions whereby said worm has a substantial range of axial motion free from any spring cushioning.

5. An induction voltage regulator including a rotor and a stator, a worm and gear for adjusting the position of the rotor with respect to the stator, the gear being attached to the rotor so that it vibrates angularly therewith, a drive shaft on which said worm is axially loosely slidable, and at least one non-metallic sleeve mounted between said shaft and said worm.

6. In an induction voltage regulator, a rotor carrying a gear segment, a drive shaft, a worm gear loosely mounted on said shaft in engagement with said gear segment, a coupling between said shaft and worm gear for permitting free sliding motion of said worm gear relative to said shaft while preventing continuous rotation of said worm gear relative to said shaft, and a pair of non-linear build-up spring cushions mounted on said shaft between said bearings and the ends of said worm gear, said springs leaving a range of free sliding motion of said worm gear on said shaft.

7. In an induction voltage regulator, a rotor carrying a gear segment, a drive shaft, a worm gear loosely mounted on said shaft in engagement with said gear segment, non-metallic liners between said shaft and worm gear, the teeth of said gear segment and worm gear having a substantial amount of clearance therebetween, a coupling between said shaft and worm gear for permitting free sliding motion of said worm gear relative to said shaft while preventing continuous rotation of said worm gear relative to said shaft, thrust bearings for said shaft, and a pair of non-linear build-up spring cushions mounted on said shaft between said bearings and the ends of said worm gear, said spring cushions having a predetermined clearance between said bearings and said worm gear.

8. In an induction voltage regulator having a rotor and a stator, in combination, a gear attached to the rotor, a drive shaft, bearings for preventing axial and radial motion of said shaft, a worm gear loosely mounted on said shaft in loose engagement with the rotor gear, and a driving coupling between said shaft and worm gear for permitting axial sliding motion of said worm gear on said shaft.

HARRY R. WEST.